United States Patent
Rowley

(10) Patent No.: US 8,613,057 B2
(45) Date of Patent: Dec. 17, 2013

(54) IDENTITY MANAGEMENT FACILITATING MINIMUM DISCLOSURE OF USER DATA

(75) Inventor: Peter A. Rowley, Ben Lomond, CA (US)

(73) Assignee: Red Hat, Inc., Raleigh, NC (US)

( * ) Notice: Subject to any disclaimer, the term of this patent is extended or adjusted under 35 U.S.C. 154(b) by 921 days.

(21) Appl. No.: 11/605,781

(22) Filed: Nov. 27, 2006

(65) Prior Publication Data

US 2008/0127314 A1    May 29, 2008

(51) Int. Cl.
*G06F 21/00*    (2013.01)

(52) U.S. Cl.
USPC ........ 726/5; 726/27; 726/28; 726/29; 726/30; 713/155; 713/156; 713/157; 713/158; 713/159; 713/182; 713/183; 713/184; 713/185; 713/186; 709/225; 709/226; 709/227; 709/228; 709/229; 380/30; 380/242; 380/259; 380/260

(58) Field of Classification Search
USPC .......... 726/18–19, 2–8, 26–30; 709/227–229, 709/225; 713/155–159, 182–186, 168–174
See application file for complete search history.

(56) References Cited

U.S. PATENT DOCUMENTS

| | | | |
|---|---|---|---|
| 6,553,493 B1 | 4/2003 | Okumura et al. | |
| 6,701,434 B1 | 3/2004 | Rohatgi | |
| 7,222,362 B1 * | 5/2007 | Canetti et al. | 726/5 |
| 7,716,469 B2 * | 5/2010 | Bhatnagar et al. | 713/156 |
| 8,010,795 B2 | 8/2011 | Rowley et al. | |
| 8,108,921 B2 * | 1/2012 | Shin et al. | 726/8 |
| 8,490,154 B2 * | 7/2013 | Gomez et al. | 726/2 |
| 2003/0196099 A1 | 10/2003 | Lampson et al. | |
| 2004/0083368 A1 | 4/2004 | Gehrmann | |
| 2004/0139319 A1 * | 7/2004 | Favazza et al. | 713/168 |
| 2005/0050333 A1 | 3/2005 | Yeap et al. | |
| 2005/0283443 A1 * | 12/2005 | Hardt | 705/67 |
| 2006/0075473 A1 | 4/2006 | Moreh et al. | |
| 2006/0149846 A1 | 7/2006 | Schuba | |

FOREIGN PATENT DOCUMENTS

WO    WO 2005/125089    12/2005

OTHER PUBLICATIONS

Sheing et al, "Zero Knowledge and Soundness are Symmetric", Mar. 23, 2007, School of Engineering and Applied Sciences Harvard University.*
International Search Report and Written Opinion of the International Searching Authority, PCT/US07/22931 filed Oct. 29, 2007, mailed Jun. 5, 2008, 9 pages.
PCT International Preliminary Report on Patentability (Chapter 1 of the Patent Cooperation Treaty), PCT/US2007/022931 filed Oct. 29, 2007, mailed Jun. 11, 2009.
U.S. Appl. No. 11/605,520, Office Action mailed Sep. 28, 2010.
U.S. Appl. No. 11/605,520, Final Office Action mailed Jun. 8, 2010.
U.S. Appl. No. 11/605,520, Office Action mailed Nov. 18, 2009.
U.S. Appl. No. 11/605,520, Advisory Action mailed Aug. 19, 2010.
Notice of Allowance mailed Apr. 25, 2011, for U.S. Appl. No. 11/605,520.

* cited by examiner

*Primary Examiner* — Taghi Arani
*Assistant Examiner* — Josnel Jeudy
(74) *Attorney, Agent, or Firm* — Lowenstein Sandler LLP

(57) ABSTRACT

A method and apparatus to prove user assertions. A client request to authenticate a user assertion pertaining to user personal data may be received. The requested authentication may be generated for the client, the authentication proving the user assertion without revealing other information about the user. The requested authentication may be sent to the client.

22 Claims, 12 Drawing Sheets

IDENTITY MANAGEMENT FACILITATING MINIMUM DISCLOSURE OF USER DATA

TECHNICAL FIELD

Embodiments of the present invention relate to identity management and more specifically to proving assertions without revealing additional information.

BACKGROUND

Public key cryptography is a security standard used over networks such as the internet. Public key cryptography is a form of assymetric key cryptography that includes a public key pair having a public key and a private key. As the name indicates, the public key is published to the public for anyone to use, and the private key is kept secret by a private key holder. Articles of information encrypted with the public key can only be decrypted by the private key. The private key can also be used to perform a cryptographic function called digital signing, that proves the authenticity of the signed data.

Many products and services offered on the internet require an individual to prove certain information before the product or service can be provided to a client. For example, to purchase alcohol online a user must first prove that he is 21 or over. To prove this, he must enter certain personal information such as his name, date of birth, and driver's license number. The amount of information that must be provided includes much more personal information than merely specifying whether or not the user is actually over 21. This extra information must be provided so that the web server that is selling the alcohol can verify that the user is over 21.

BRIEF DESCRIPTION OF THE DRAWINGS

The present invention is illustrated by way of example, and not by way of limitation, in the figures of the accompanying drawings and in which.

DETAILED DESCRIPTION

Figure 1:
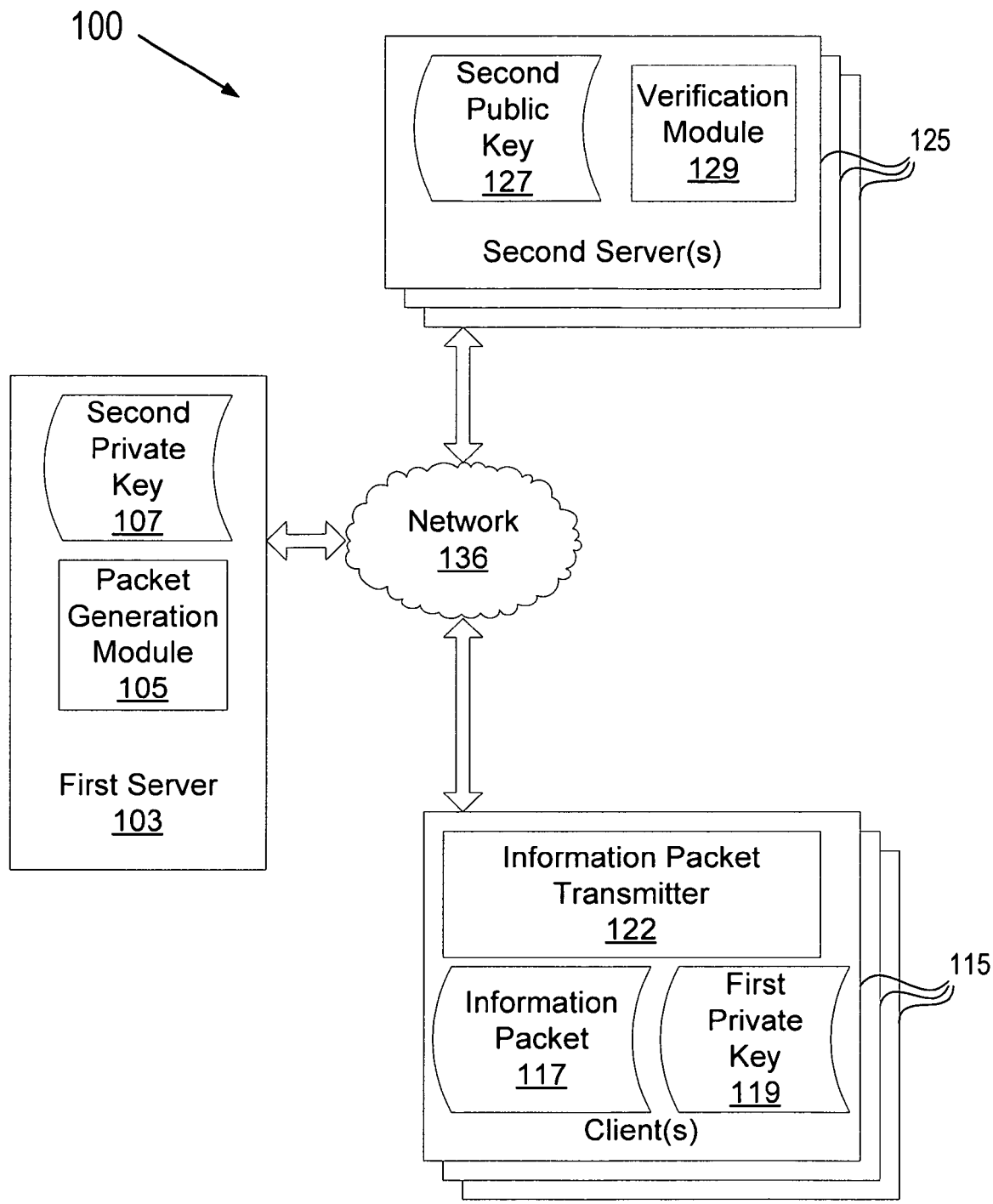
FIG. 1 illustrates an exemplary network architecture in which embodiments of the present invention may operate.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatuses for performing the operations herein. This apparatuses may be specially constructed for the required purposes, or may comprise one or more general purpose computers selectively activated or reconfigured by computer programs stored in the computers. Such computer programs may be stored in computer readable storage mediums, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatuses to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable storage medium includes any mechanism for storing or transmitting information in a form readable by a machine (e.g., a computer). For example, a machine-readable storage medium includes read only memory ("ROM"), random access memory ("RAM"), magnetic disk storage media, optical storage media, and flash memory devices, etc.

Overview

Described herein is a method and apparatus for secure information transfer using dedicated public key pairs for articles of information. In one embodiment, this is achieved by digitally signing articles of information and/or information packets with multiple signature layers. Each signature layer can be generated with a different public key pair. In one embodiment, a first public key pair is generated for an article of information. The article of information is combined with a first public key from the first public key pair to form an information packet. The information packet is then digitally signed with a second private key from a second private key pair. The second private key pair can be associated with a trusted information source.

The use of dedicated public key pairs for articles of information provides increased security. In one embodiment, the level of security can depend on the number of signature layers that an article of information possesses.

Multiple signature layers and/or dedicated public key pairs for articles of information can be used to prove an assertion pertaining to sensitive data without revealing the sensitive data itself. This sensitive data may be, for example, personal data of a user. In one embodiment, a client request to authenticate a user assertion pertaining to user personal data is received. The requested authentication is created for the client to prove the user assertion without revealing other information about the user. The requested authentication is then sent to the client. The client can thereafter prove the user assertion to third parties by providing them with the authentication.

Secure Information Transfer Using Dedicated Public Key Pairs

FIG. 1 illustrates an exemplary network architecture 100, in which embodiments of the present invention may operate. The network architecture 100 may include a first server 103, client devices (clients) 115, second server devices (second servers) 125 and a network 136. The clients 115 may be, for example, personal computers (PCs), mobile phones, palm-sized computing devices, personal digital assistants (PDAs), etc. The first server 103 may be a server operated by a trusted information source such as a certificate authority (CA), a government institution, a bank, an employer, etc. The second servers 125 may be web servers, chat servers, list servers, mail servers, etc.

Clients 115 are coupled to the first server 103 and second servers 125 via the network 136, which may be a public network (e.g., Internet) or a private network (e.g., Ethernet or a local area network (LAN)).

In one embodiment, the first server 103 has a packet generation module 105 that generates a first public key pair for an article of information, creates an information packet 117 with the first public key pair and the article of information, and uses a second private key 107 of a second (preexisting) private key pair to digitally sign the information packet 117 that is then sent to a client 115. The first public key pair can authenticate the client 115 as the rightful holder of the information packet 117. The second public key pair can be used to authenticate the article of information included in the information packet 117. The packet generation module 105 may be part of the first server 103 or some other device and/or program, or be an independent module implemented in hardware, software or a combination thereof.

In one embodiment, the information packet 117 created by the packet generation module 105 includes a first public key of the first public key pair, and an article of information that is digitally signed with a first private key 119 of the first public key pair. The first private key 119 can then be sent to one of the clients 115, so that only that client can decrypt data encrypted with the first public key. In an alternative embodiment that will be discussed in more detail below, the information packet 117 includes the first public key, but the article of information is not signed with the first private key 119.

In one embodiment, each of the clients 115 include an information packet transmitter 122, an information packet 117 and a first private key 119. Each client may include multiple information packets and multiple first private keys. The information packet transmitter 122 can be used to receive the information packet 117 and first private key 119 from the first server 103 and to send the information packet 117 to the second servers 125.

Each of the second servers 125 may include the second public key 127 and a verification module 129. The second public key 127 can be obtained from the first server 103, or from another source. The verification module 129 may be part of the second servers 125 or some other device and/or program, or be an independent module implemented in hardware, software, or a combination thereof. The verification module 129 may use the second public key 127 to verify any information packet 117 digitally signed with the second private key 107. In one embodiment, the verification module 129 may further use the first public key to verify the digitally signed article of information.

FIGS. 2-11 illustrate flow diagrams of some embodiments of methods for generating and using digitally signed information packets. The methods may be performed by processing logic that may comprise hardware (e.g., circuitry, dedicated logic, programmable logic, microcode, etc.), software (such as instructions run on a processing device), or a combination thereof.

Figure 2:
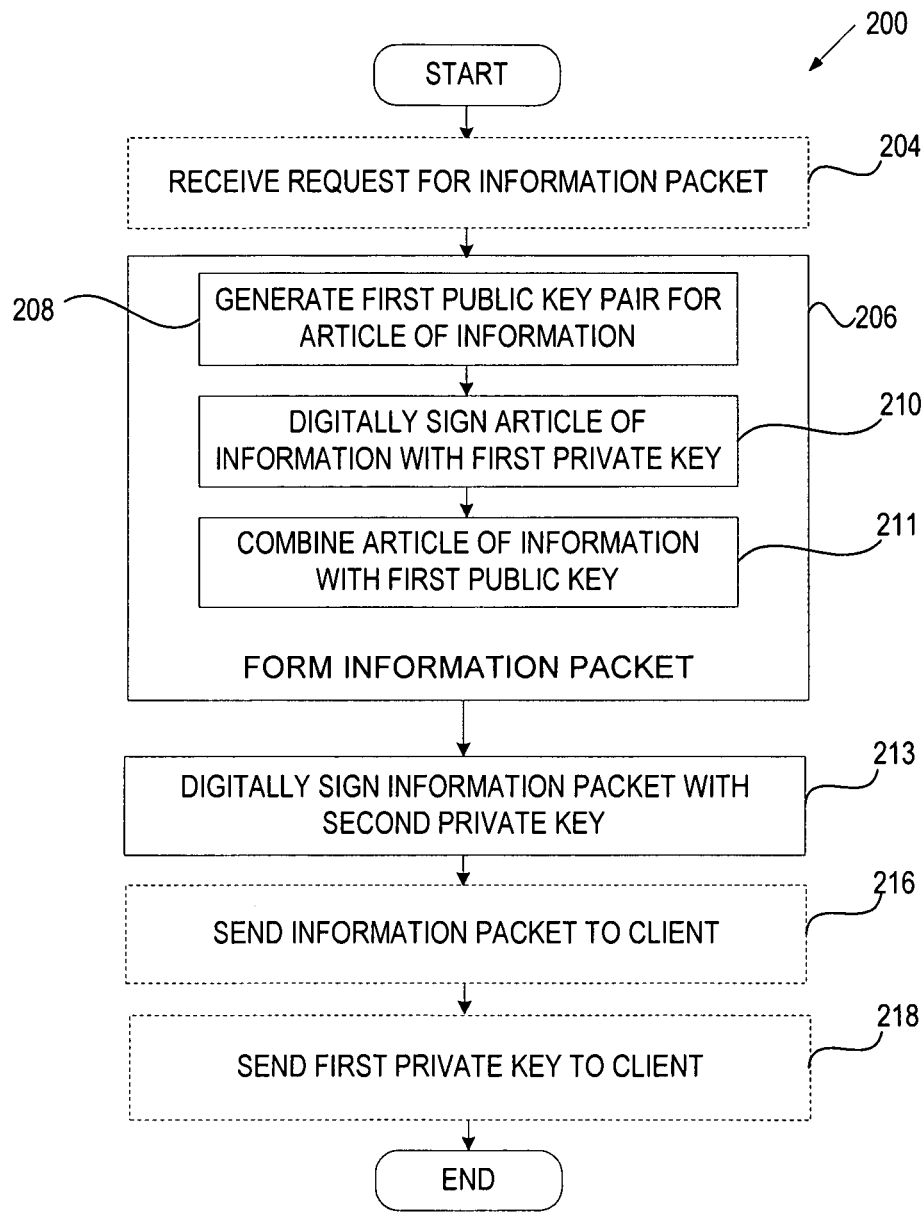
FIG. 2 illustrates a flow diagram of one embodiment of a method for generating digitally signed information packets.

FIG. 2 illustrates a flow diagram of one embodiment of a method 200 for generating digitally signed information packets. In one embodiment, method 200 is performed by the first server 103 of FIG. 1.

Referring to FIG. 2, method 200 begins with block 204, in which a request for a digitally signed information packet is received at a server. The request for a digitally signed information packet can be received from a client, or from a server. Alternatively, blocks 206-213 can be performed without first receiving a request.

At block 206, an information packet is formed. In one embodiment, the information packet is formed upon receiving the request. In another embodiment, the digitally signed information packets are pre-generated so that when a client requests a information packet, it needs only to be sent to that client. This can improve the response time for sending digitally signed packets.

The information packet can include an article of information that is static or dynamic. Static articles of information will not change over time. For example, once an individual is over the age of 21, he or she will always be over the age of 21. Therefore an information packet stating that the individual is over 21 will never change. In contrast, dynamic articles of information are capable of change. Examples include memberships in organizations that can expire, marriage status, etc. Where the article of information is dynamic, information packets may be valid for only a set time period.

The information packet can include an article of information that has user information, device information, and/or any other information type. The article of information can be present at the server, or it can be gathered from external sources. An article of information may be, for example, a mail message, a file, a program, a web page, etc. In one embodiment, the article of information does not contain a user identity or an organization identity, nor does it contain any user identifier or organization identifier.

In one embodiment, an information packet contains multiple articles of information that may be related or unrelated to each other. By placing multiple articles of information into a single information packet, the total bandwidth used to send and receive information packets, and the computational time required to generate digitally signed information packets, can be reduced.

In one embodiment, an information packet is formed according to blocks 208-211. The information packet can be generated such that it does not contain a unique identifier. The exclusion of unique identifiers can increase the anonymity of individuals using the information packets.

At block 208, a first public key pair, having a first public key and a first private key, is generated for an article of information. The first public key pair may be generated specifically for this article of information. Alternatively, the first public key pair may be generated specifically for multiple articles of information.

At block 210, the article of information is digitally signed with the first private key. The digital signature can link the first public key pair with the article of information to show that the public key pair should be used with that article of information. The digital signature can also ensure that the article of information has not been modified for the duration of its existence. This can be useful where the article of information is gathered from an external source.

In alternative embodiments, the article of information is not digitally signed. Whether or not the article of information is digitally signed, the first public key is combined with the article of information to form the information packet (block 211). The entity that receives the information packet thereafter will be able to use the included first public key to verify the digitally signed article of information.

In one embodiment, the information packet is formed externally to the server (e.g., if the article of information is gathered from an external source). This can guarantee that the article of information is not tampered with before it reaches the server. Alternatively, the information packet is formed within the server. One embodiment of a method for forming an information packet is discussed in more detail below in conjunction with FIG. 3.

At block 213, the information packet is digitally signed with a second private key. The second private key is part of a second public key pair, having a second private key and a second public key, that is associated with the entity that digitally signs the information packet. The entity can be a trusted information source, such as a certificate authority (CA), government agency, bank, employer, etc. The encrypted information packet is then sent to the client that requested it (block 216), and the first private key is sent to the client together or separate from the encrypted information packet (block 218). In one embodiment, the second public key is also sent to the client.

Figure 3:
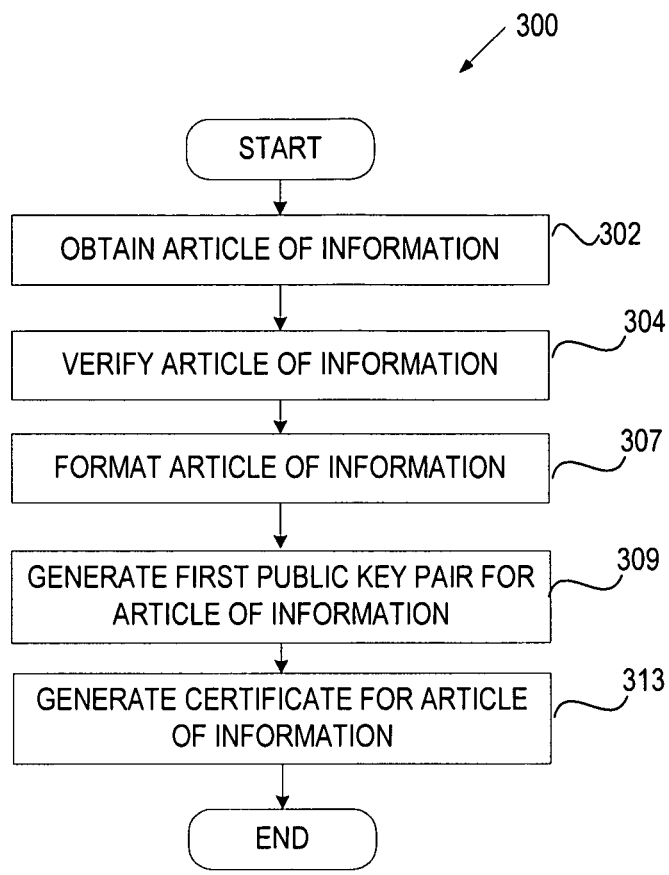
FIG. 3 illustrates a flow diagram of one embodiment of a method for forming an information packet.

FIG. 3 illustrates a flow diagram of one embodiment of a method 300 for forming an information packet. In one embodiment, method 300 is performed by first server 103 of FIG. 1.

At block 302, an article of information is obtained. The article of information may be obtained from the client, or from a third party, such as a governmental agency (e.g. the department of motor vehicles (DMV)), a bank, an employer, etc. In alternative embodiments, the article of information is already in the possession of the entity that is creating the information packet, and does not need to be obtained from an external source. For example, where the entity is a government agency such as the DMV or social security agency, it may already possess the necessary information, and need not take any action to gain possession thereof.

At block 304, the information is checked to ensure its accuracy and/or authenticity. In one embodiment, the information is checked by comparing it to data stored at a trusted information source. In one embodiment, the client must agree to permit the information check before it is performed.

In another embodiment, no information check is performed. For example, where the entity generating the information packet is the source of the information, such as a governmental agency, it may not need to check that the information is correct. An information check may also be unnecessary when the first public key pair has been generated, and the article of information has been digitally signed, at an external location from which the article of information was originated.

At block 307, the article of information is formatted. The article of information may be formatted to common file types such as word documents, .pdf files, text files, etc. Alternatively, no formatting may be necessary (e.g., if the article of information is already formatted in a common file type). Next, a first public key pair is generated for the article of information (block 309).

At block 313, a certificate is generated for the article of information. In one embodiment, the certificate is a public key certificate that includes an information packet. The information packet contained within the certificate can include the first public key and the article of information. In one embodiment, the certificate uses a digital signature to bind together the information packet. The digital signature can be generated by performing a cryptographic function on the information packet with a second private key from a second public key pair.

The certificate can include a number of values, including a unique identifier for an associated client or user, a unique identifier for the certificate itself, an expiry date, the location of a revocation center, etc. In one embodiment, the certificate is an X.509 certificate. In alternative embodiments, different certificate standards are used.

The expiry date can be useful for articles of information that are only valid for a short duration. For example, an article of information might include an assertion that a user is under the age of 14. Eventually the user will not be under the age of 14. Therefore, the expiry date can be used to render the information packet invalid once the user reaches his $15^{th}$ birthday.

The location of a revocation center that is associated with the certificate can be useful to determine certificate status. Third parties can check certificate revocation lists (CRLs) that are distributed by the revocation center (usually a CA) to determine whether a certificate has been revoked. Certificates are revoked when the first private key of the first public key pair associated with the article of information becomes compromised.

Figure 4:
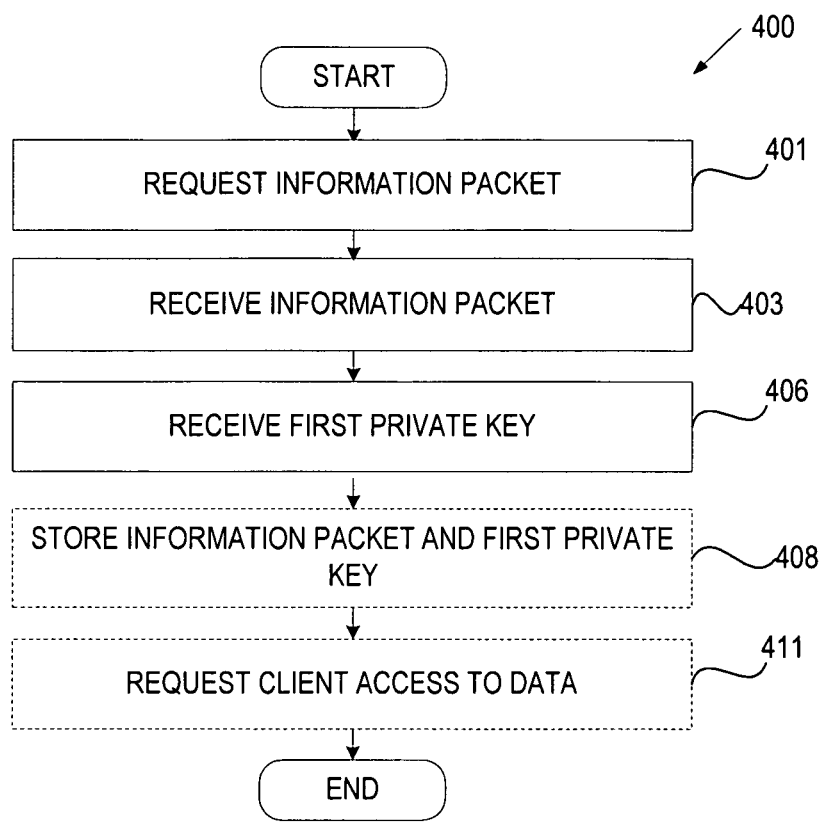
FIG. 4 illustrates a flow diagram of one embodiment of a method for using digitally signed information packets at a client.

FIG. 4 illustrates a flow diagram of one embodiment of a method 400 for using digitally signed information packets at a client. In one embodiment, the method is performed by clients 115 of FIG. 1.

Referring to FIG. 4, at block 401, an information packet is requested. The information packet can be requested once for a particular article of information, or it may be requested each time a client attempts to gain access to the article of information. In one embodiment, information packets are requested on a periodic basis (e.g., when older information packets expire).

The information packet can be requested from a trusted information source. Trusted information sources can provide digitally signed information packets in hierarchical public key infrastructure (PKI) schemes such as X.509. Alternatively, the information packet can be generated at the client, or requested from another client or server. Clients and servers other than trusted information sources can generate digitally signed information packets where encryption methodologies such as open pretty good privacy (Open PGP) or other web of trust encryption schemes are implemented.

At block 403, the digitally signed information packet is received. At block 406, the first private key associated with the article of information contained within the encrypted information packet is received. The first private key is generally received from the same source as the information packet. In one embodiment, a second public key is also received, the second public key being associated with the trusted information source.

At block 408, the digitally signed information packet and first private key are stored at the client, such as in a local data store. Once the digitally signed information packet and first private key are stored at the client, the client no longer needs to contact the entity from which it was received in regards to the information packet. In alternative embodiments, the digitally signed information packet contains dynamic information, and may not be stored at the client. If the information packet is not stored at the client, then it must be requested each time the client needs it.

At block 411, the client requests client access to data from a server (e.g., second sever 125 of FIG. 1). One embodiment of a method for requesting client access to data from a server will be discussed in greater detail below in conjunction with FIG. 5. In one embodiment, blocks 401-408 are executed each time a user of the client device needs to receive access to data provided by the server.

Figure 5:
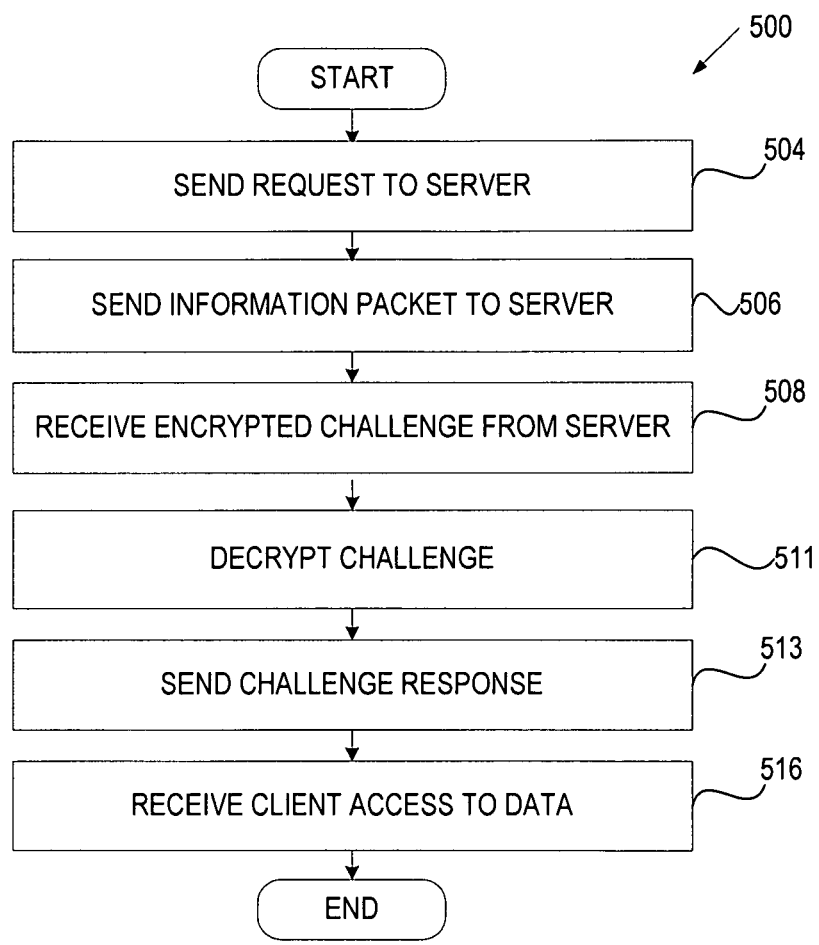
FIG. 5 illustrates a flow diagram of one embodiment of a method for requesting client access to data from a server.

FIG. 5 illustrates a flow diagram of one embodiment of a method 500 for requesting client access to data from a server. In one embodiment, method 500 is performed by clients 125 of FIG. 1.

At block 504, a request for client access to data is sent to the server. At block 506, the digitally signed information packet is sent to the server. In one embodiment, the second public key is also sent to the server. Prior to sending the information packet to the server, the client may receive a demand from the server for the information packet. Alternatively, the client may anticipate the need for the information packet and send it without first receiving a demand.

At block 508, the client receives an encrypted challenge from the server. The encrypted challenge can be arbitrary or specific data that is encrypted with a first public key that is the asymmetric counterpart to the first private key stored by the client. At block 511, the encrypted challenge is decrypted with the first private key. At block 513, the client sends a challenge response to the server. In one embodiment, the challenge response is a decrypted version of the original challenge. Alternatively, the challenge response may be an answer to a question that was encrypted in the challenge, or some other form of response. In one embodiment, the challenge response is encrypted with the first private key.

The encrypted challenge is a means for ensuring that the client sending the information packet has right of possession. The first private key enables a successful challenge response from only the rightful holder of the information packet because the rightful holder has to have the first private key. Therefore, the encrypted challenge can increase security.

In certain embodiments, no encrypted challenge is used to verify the client's right to possess the information packet.

Instead, other methods of ensuring that the information packet holder has the right to use the information packet may instead be used. In one embodiment, a secure transport is set up between the client and the server, such as by using a digital certificate. Examples of secure transports include secure sockets layer (SSL) and transport layer security (TLS). Secure transport provides endpoint verification in which the client can verify that it has the right to use the information packet, and the server can verify that it has the right to demand the information packet.

At block 516, the client receives access to data. Access to data can be received once the server has verified that the packet of information is authentic, and that the client has the right to use the information packet.

Figure 6:
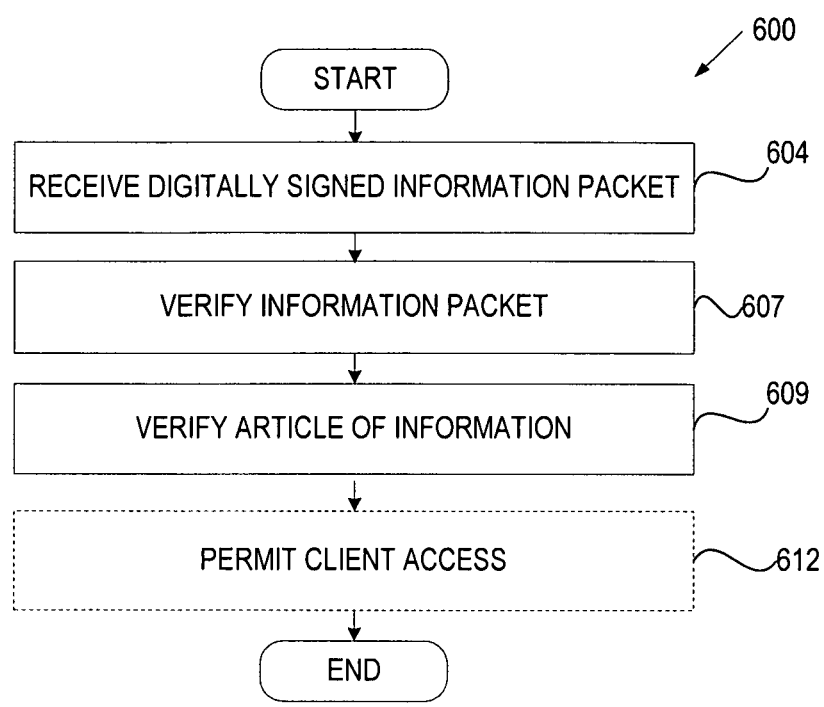
FIG. 6 illustrates a flow diagram of one embodiment of a method for using digitally signed information packets.

FIG. 6 illustrates a flow diagram of one embodiment of a method 600 for using digitally signed information packets. In one embodiment, the method is performed by second servers 125 of FIG. 1.

Referring to FIG. 6, at block 604, a digitally signed information packet is received. In one embodiment, the information packet is received by a web server. In alternative embodiments, other types of servers or clients may receive the digitally signed information packets.

At block 607, the digitally signed information packet is verified using the second public key. A successful verification indicates that the contents of the information packet are authentic and can therefore be trusted. At block 609, the article of information is verified. The article of information can be verified without communication with a trusted information source such as the originator of the information packet. In particular, in one embodiment, in which the article of information has been digitally signed with a first private key, the article of information can be verified by performing a cryptographic function to check the digital signature with the first public key.

In embodiments in which the article of information is not digitally signed, the article of information can be verified by sending an encrypted challenge to the client. This method of verifying the article of information may also be implemented for embodiments in which the article of information is signed. For embodiments in which the article of information is signed, one or both of the verification techniques can be used. Verifying the article of information may ensure that the client attempting to gain access to data on the server is authorized to use the information packet. One embodiment of a method for verifying the article of information will be discussed in more detail below in conjunction with FIG. 7.

At block 612, the client's access to the requested data is granted.

Figure 7:
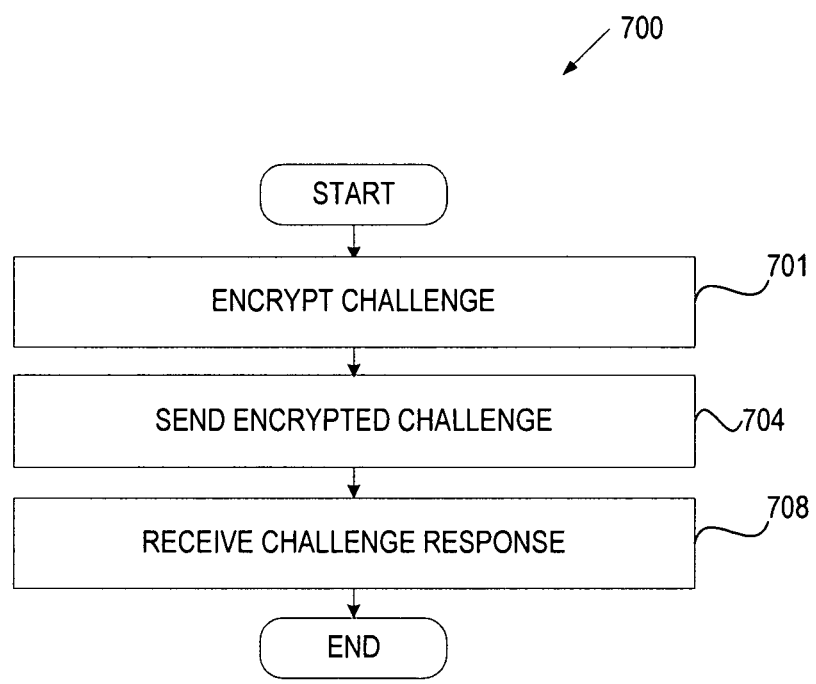
FIG. 7 illustrates a flow diagram of one embodiment of a method for verifying an article of information.

FIG. 7 illustrates a flow diagram of one embodiment of a method 700 for verifying the article of information. In one embodiment, method 700 is performed by second servers 125 of FIG. 1.

At block 701, a challenge is encrypted with the first public key. At block 704, the encrypted challenge is sent to the client attempting to access data. At block 708, a challenge response is received. If the challenge response is a successful challenge response, then the article of information has been verified, and client access to data is permitted. If the challenge response is not successful, then the client is not permitted access to the data.

Identity Management Facilitating Minimum
Disclosure of User Data

In some embodiments, the digitally signed information packets discussed above are used for identity management. In particular, a digitally signed information packet containing an article of information and a public key associated with that article of information can be used to prove an assertion without revealing other information. For example, the article of information could make the assertion that the holder of the information packet is over 21, a male, a student, a United States citizen, etc. The digital signature and a public key in the information packet can be used to verify that the statement "I am over 21" is an accurate statement, and that the user making the assertion has the right to do so. In alternative embodiments, other mechanisms can be used for identity management discussed herein.

In one embodiment, for example, a user sets up an account with a first server (e.g. a trusted information source) by which the first server makes live authentications on behalf of the user. The first server may gather and/or verify personal information about the user when the account is established. Thereafter, the first server makes authentications for the user regarding any true user assertions. Authentications may be user assertions generated and digitally signed by the first server. For example, if the user's birth date is 1977, then the first server could make and sign a user assertion that the user is over 18, that he is over 21, that he is under 60, and so on, as needed.

A real time connection may be established between a second server (e.g. a web server) and the first server. The second server may send demands for specific authentications regarding the user, and the first server may reply with the necessary authentications if they can truthfully be made. Authentications may be generated and stored at the first server for future use, or generated as requested by the second server. Since authentications are stored or generated by the first server, the client may access servers that require authentications from any location or compatible device by logging into the first server, and/or by directing the second servers to the first server.

Figure 8:
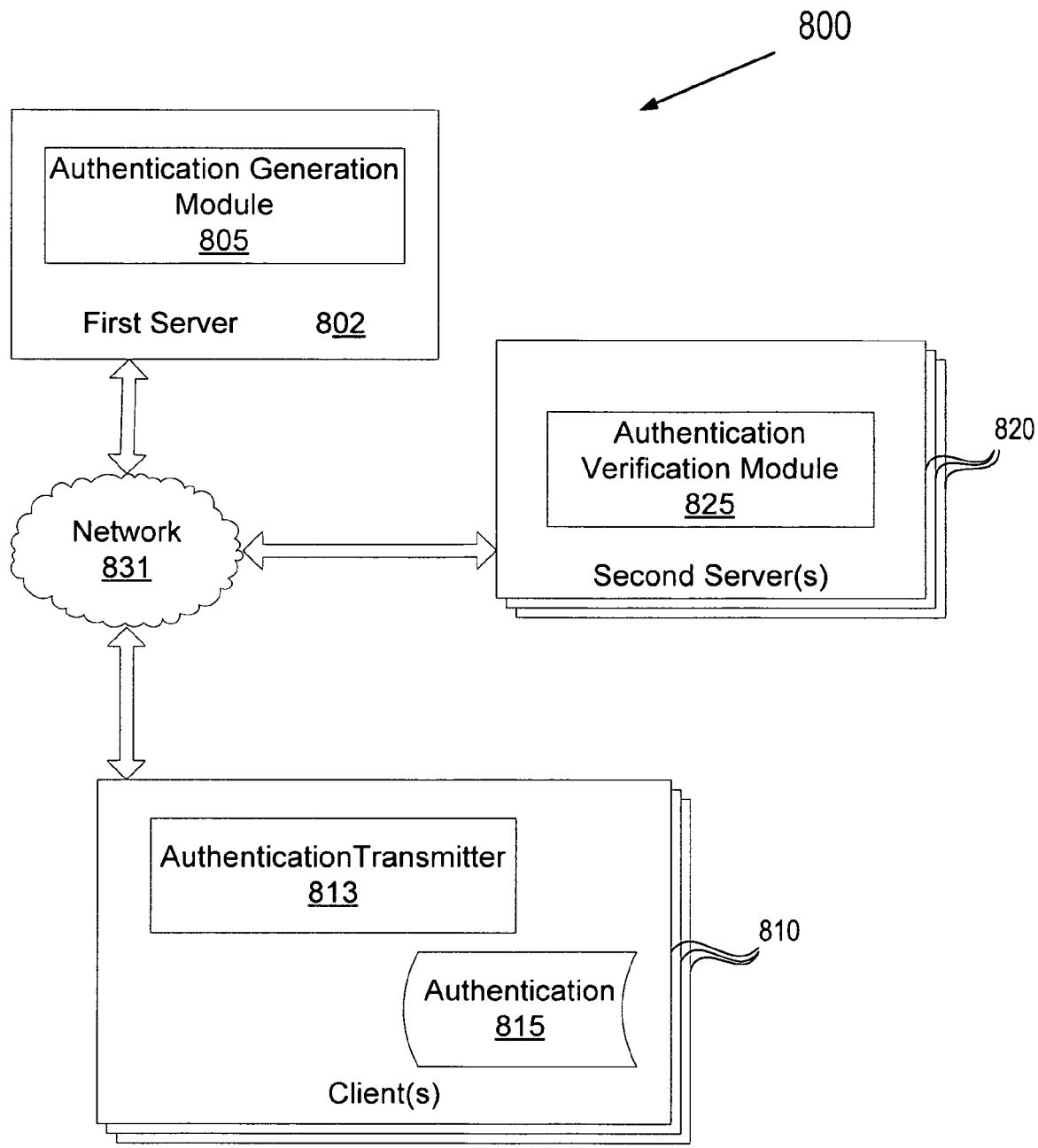
FIG. 8 illustrates an exemplary network architecture in which embodiments of the present invention may operate.

FIG. 8 illustrates an exemplary network architecture 800, in which embodiments of the present invention may operate. The network architecture 800 may include a first server 802, client devices (clients) 810, second server devices (second servers) 820 and a network 831. The clients 810 may be, for example, personal computers (PCs), mobile phones, palm-sized computing devices, personal digital assistants (PDAs), etc. The first server 802 may be a server operated by a trusted information source, and the second servers 820 may be web servers, chat servers, list servers, mail servers, etc.

The clients 810 are coupled to the first server 802 and second servers 820 via the network 831, which may be a public network (e.g., Internet) or a private network (e.g., Ethernet or a local area Network (LAN)).

In one embodiment, the first server 802 hosts an authentication generation module 805 that can handle requests, received from clients 801, to create authentications of user assertions pertaining to user personal data.

In one embodiment, each of the clients 810 includes an authentication transmitter 813 and an authentication 815. Each client may include multiple authentications, each authentication proving a different user assertion. In one embodiment, the authentications prove user assertions without revealing other information about the user. For example, an assertion can prove that a user is over 21 without revealing his birth date. The authentication transmitter 813 can be used to receive the authentication 815 from the first server 802 and to send it to the second servers 820.

Each of the second servers 820 may include an authentication verification module 825. The authentication verification module 825 may verify that the authentication 815 is valid and that the sender of the authentication has a right to send it. In one embodiment, the authentication verification module 825 verifies whether authentications are valid without contacting the first server 802. This can minimize the sharing of user information between the first server 802 and second servers 820.

Figure 9:
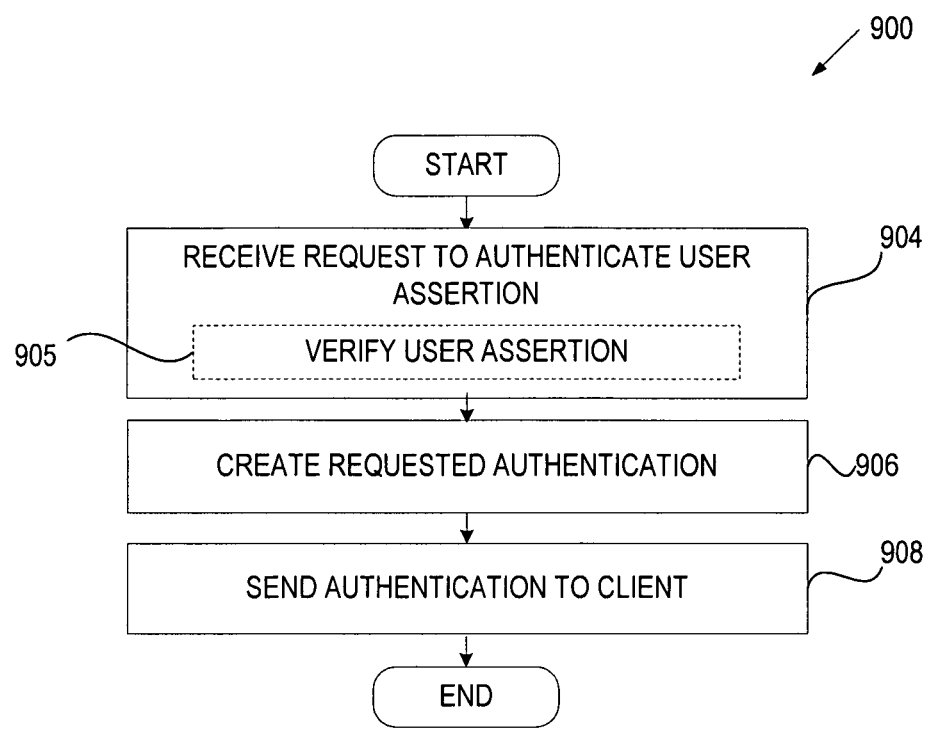
FIG. 9 illustrates a flow diagram of one embodiment of a method for generating authentications.

FIG. 9 illustrates a flow diagram of one embodiment of a method 900 for generating authentications. The method 900 may be performed by processing logic that may comprise hardware (e.g., circuitry, dedicated logic, programmable logic, microcode, etc.), software (such as instructions run on a processing device), or a combination thereof. In one embodiment, method 900 is performed by the first server 802 of FIG. 8.

Referring to FIG. 9, method 900 begins with block 904, in which a request to authenticate a user assertion is received. In one embodiment, the request is received at a server that is a trusted information source. The request to authenticate a user assertion can be received from a client, or from a server. At block 905, the user assertion is checked to determine whether it is a true assertion. In one embodiment, the server that received the request to authenticate the user assertion may store some personal data about the user (e.g., if the server is maintained by a bank, an employer, or a governmental agency). Where the server already has the user information, the user assertion can be compared to this information to determine whether the assertion is correct. In an alternative embodiment, the server is an entity, such as a CA, that does not store the user information. Where the user information is not present at the server, the server can send inquiries to other servers that store the user information (e.g., to governmental agencies, banks, etc.). Once the user information is obtained, it can be compared to the user assertion to determine whether the user assertion is correct.

At block 906, the requested user authentication is created. The authentication may be created once the user assertion has been verified. At block 908, the authentication is sent to the user.

Figure 10:
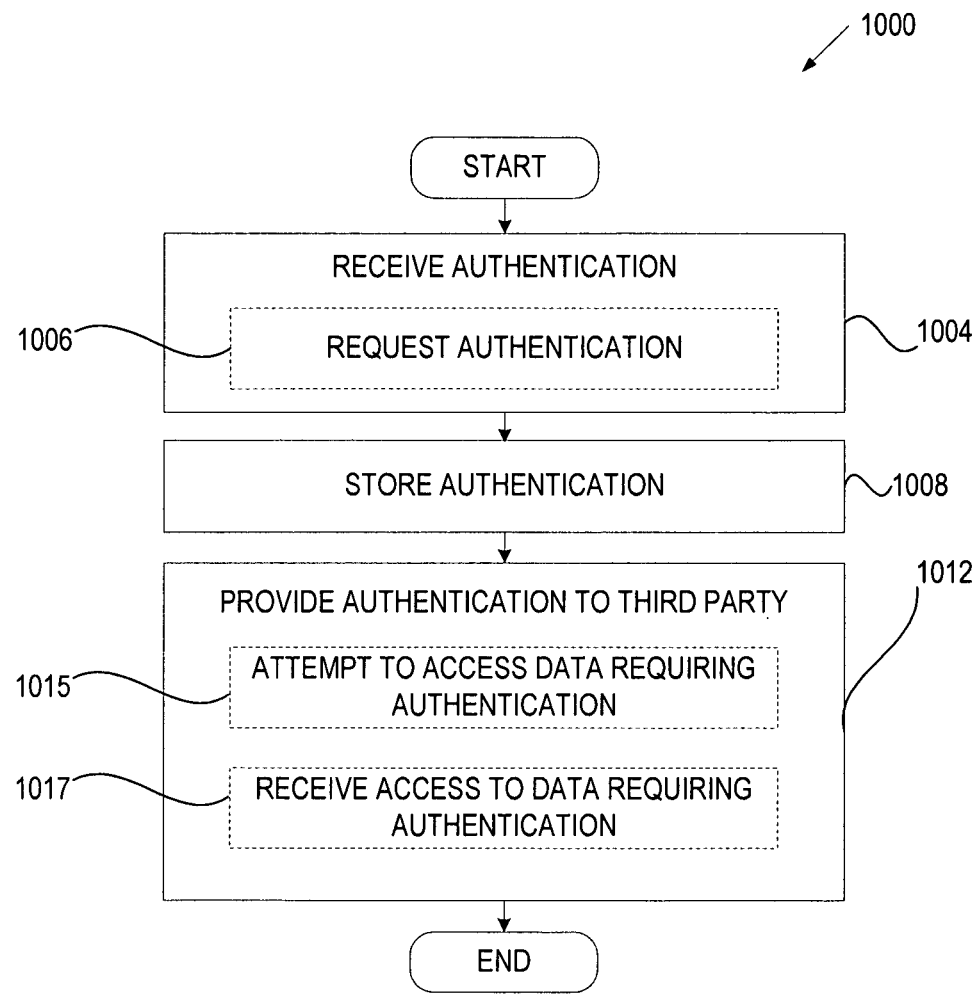
FIG. 10 illustrates a flow diagram of one embodiment of a method for using authentications at a client.

FIG. 10 illustrates a flow diagram of one embodiment of a method 1000 for using authentications at a client side. The method 1000 may be performed by processing logic that may comprise hardware (e.g., circuitry, dedicated logic, programmable logic, microcode, etc.), software (such as instructions run on a processing device), or a combination thereof. In one embodiment, method 1000 is performed by the clients 810 of FIG. 8.

Referring to FIG. 10, method 1000 begins with block 1004, in which an authentication is received. In one embodiment, the authentication is received after requesting it from a server (block 1006). At block 1008, the authentication is stored at the client. Thereby, the client may request the authentication once, and use the authentication an unlimited number of times thereafter to prove a user assertion.

The authentication can include a dynamic or a static user assertion. The dynamic user assertions are capable of change, and static user assertions are incapable of change. Authentications with static user assertions can be valid indefinitely. An authentication with a dynamic user assertion can be valid for a finite period. In one embodiment, the authentication is associated with a counter that allows it to be used only a finite number of times. In one embodiment, the authentication has an expiry date, after which the authentication cannot be used.

At block 1012, the authentication is provided to a third party. The authentication can be provided to a third party in an attempt to access data that requires an authentication of a particular user assertion (e.g., to purchase alcohol, to gain access to a company website, etc.) (block 1015). Once the authentication is sent and accepted, the client can receive access to the requested data requiring authentication of the user assertion (block 1017).

Figure 11:
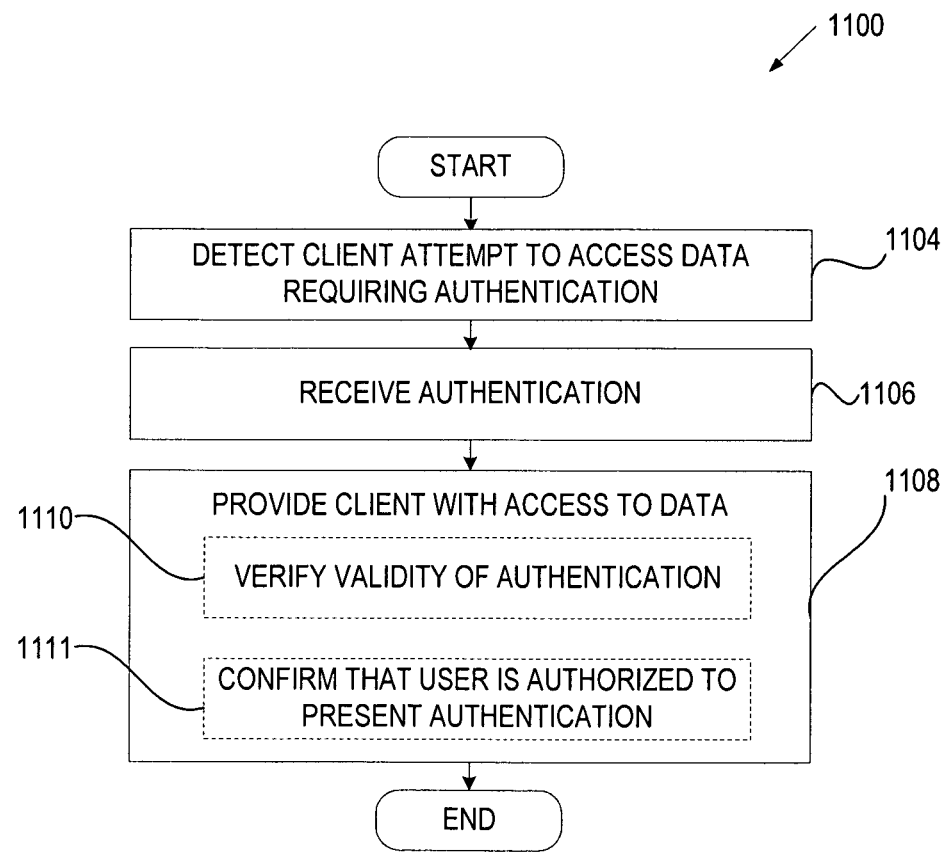
FIG. 11 illustrates a flow diagram of one embodiment of a method for using authentications at a server.

FIG. 11 illustrates a flow diagram of one embodiment of a method 1100 for using authentications at a server side. The method 1100 may be performed by processing logic that may comprise hardware (e.g., circuitry, dedicated logic, programmable logic, microcode, etc.), software (such as instructions run on a processing device), or a combination thereof. In one embodiment, method 1100 is performed by the second servers 820 of FIG. 8.

Referring to FIG. 11, method 1100 begins with block 1104, in which a client attempt to access data requiring an authentication of a user assertion is detected. At block 1106, an authentication of the user assertion is received. In one embodiment, the authentication is received after sending a request for it. Alternatively, the authentication may be received without a request.

At block 1108, the client is provided with client access to the data. The data can be a web page authorizing the online purchase of liquor, a file transfer protocol (ftp) location only accessible by members of certain affiliations, telnet address only accessible to persons having a specific security clearance, etc.

Before providing client access, the server may first verify the validity of the authentication (block 1110) and confirm that the client is authorized to present the authentication (block 1111). For example, where the authentication is a digitally signed information packet as described with reference to FIG. 2, the server may verify the digital signature and send an encrypted challenge to the client.

Exemplary Computer Architecture

Figure 12:
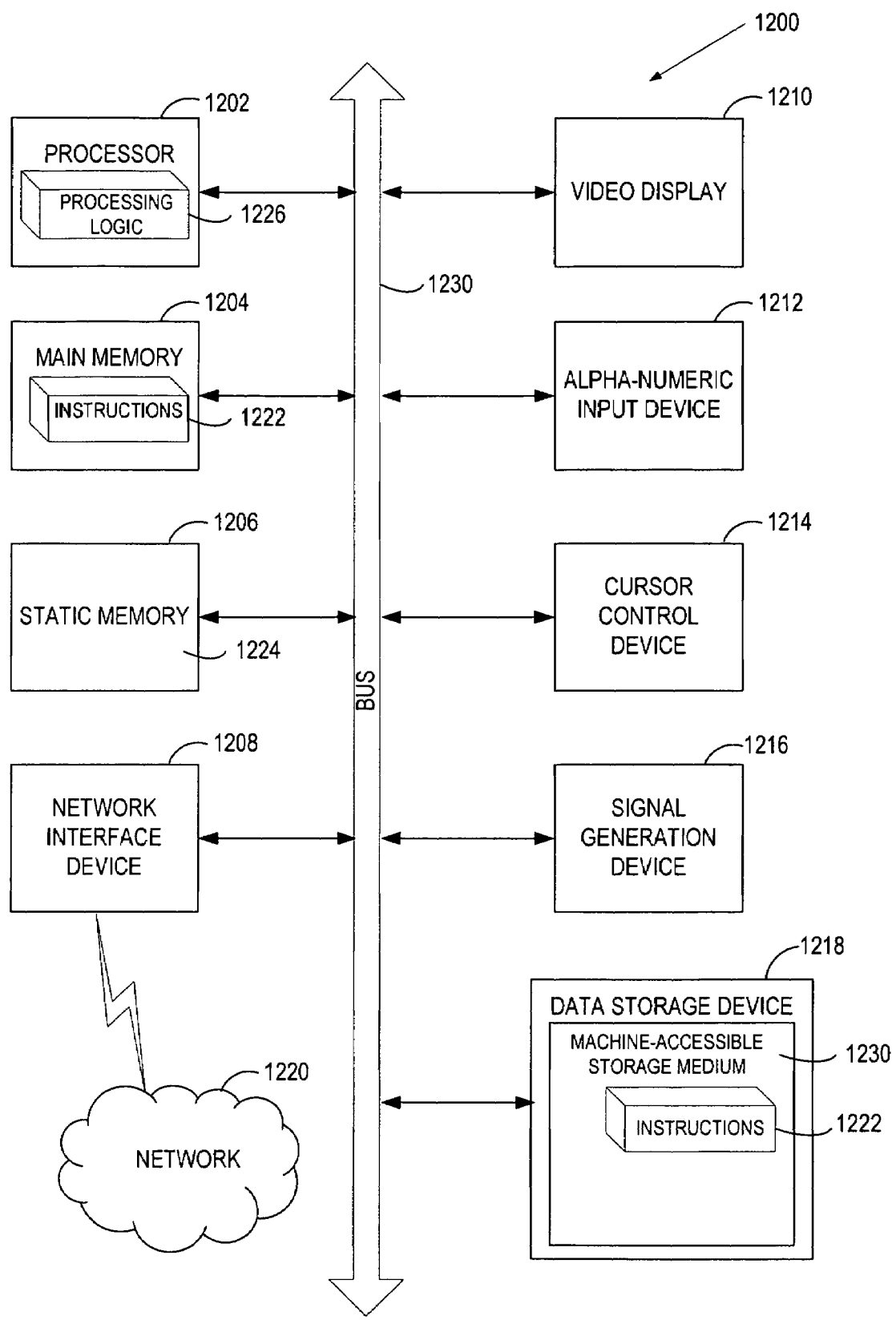
FIG. 12 illustrates a diagrammatic representation of a machine in the exemplary form of a computer system.

FIG. 12 illustrates a diagrammatic representation of a machine in the exemplary form of a computer system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1200 includes a processing device 1202, a main memory 1204 (e.g., read-only memory (ROM), flash memory, dynamic random access memory (DRAM) such as synchronous DRAM (SDRAM) or Rambus DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. The processing device 1202 is configured to execute the processing logic 1226 for performing the operations and steps discussed herein.

The computer system 1200 may further include a network interface device 1208. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker).

The data storage device 1218 may include a machine-accessible storage medium 1230 on which is stored one or more sets of instructions (e.g., software 1222) embodying any one or more of the methodologies or functions described herein. The software 1222 may also reside, completely or at least partially, within the main memory 1204 and/or within the processing device 1202 during execution thereof by the computer system 1200, the main memory 1204 and the processing device 1202 also constituting machine-accessible storage media. The software 1222 may further be transmitted or received over a network 1220 via the network interface device 1208.

While the machine-accessible storage medium 1230 is shown in an exemplary embodiment to be a single medium, the term "machine-accessible storage medium" should be taken to include a single medium or multiple media (e.g., a centralized or distributed database, and/or associated caches and servers) that store the one more sets of instructions. The term "machine-accessible storage medium" shall also be taken to include any medium that is capable of storing or encoding a sequence of instructions for execution by the machine and that cause the machine to perform any one of the methodologies of the present invention. The term "machine-accessible storage medium" shall accordingly be taken to include, but not be limited to, solid-state memories, and optical and magnetic media.

Thus, a method and apparatus for generating and using digitally signed information packets and a method and apparatus for generating and using authentications have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    receiving, by a first computer system, a request from a user at a second computer system to access data managed by the first computer system, where authentication is required for the user at the second computer system to access the data;
    receiving, by the first computer system from the second computer system, an information packet provided for the authentication, the information packet comprising a user assertion that is an article of information that declares an existence of personal user data unknown to the first computer system without revealing the personal user data to the first computer system and is generated by a third computer system for the second computer system based on information provided by the user;

transmitting, by the first computer system in response to the request, an encrypted challenge to the second computer system, wherein the encrypted challenge is encrypted with a public key that is an asymmetric counterpart to a private key stored by the second computer system;

receiving, from the second computer system in response to the encrypted challenge, an encrypted response that is encrypted with the private key;

verifying, by the first computer system, that the encrypted response received from the second computer system is valid;

verifying, by the first computer system, that the user assertion received in the information packet from the second computer system is true;

creating, by the first computer system, a confirmation of the authentication proving that the user assertion is valid, wherein the authentication does not comprise the personal user data; and sending, by the first computer system, the confirmation of the authentication of the user assertion to the second computer system in response to the request to allow the user to access the data.

2. The method of claim 1, wherein the user personal data is stored at a trusted information source accessible by the first and the second computer systems.

3. The method of claim 1, wherein the third computer system is a trusted information source.

4. The method of claim 1, wherein the information packet has an expiry date.

5. An apparatus comprising:
a network interface device; and
a processing device communicably coupled to the network interface device, the processing device to:
receive, via the network interface device, a request from a user at a computer system separate from the apparatus to access data managed by the apparatus, where authentication is required for the user at the computer system to access the data;
receive, via the network interface device from the second computer system, an information packet provided for the authentication, the information packet comprising a user assertion that is an article of information that declares an existence of personal user data unknown to the apparatus without revealing the personal user data to the apparatus and is generated by a trusted authority computer system for the computer system based on information provided by the user;
transmit, via the network interface device in response to the request, an encrypted challenge to the computer system, wherein the encrypted challenge is encrypted with a public key that is an asymmetric counterpart to a private key stored by the computer system;
receive, from the computer system in response to the encrypted challenge, an encrypted response that is encrypted with the private key;
verify that the encrypted response received from the computer system is valid;
verify that the user assertion received in the information packet from the computer system is true;
create a confirmation of the authentication proving that the user assertion is valid, wherein the authentication does not comprise the personal user data; and
provide the confirmation of the authentication of the user assertion to the computer system in response to the request to allow the user to access the data.

6. The apparatus of claim 5, wherein the computer system is further to store the confirmation of the authentication.

7. The apparatus of claim 5, wherein the computer system is to access the data requiring the authentication after receiving the confirmation of the authentication.

8. The apparatus of claim 5, wherein the information packet is provided by the trusted authority computer system to the computer system.

9. A non-transitory machine-accessible storage medium including instructions that, when accessed by a processing device, cause the processing device to perform operations comprising:

receiving, by the processing device of a first computer system, a request from a user at a second computer system to access data managed by the first computer system, where authentication is required for the user at the second computer system to access the data;

receiving, by the first computer system from the second computer system, an information packet provided for the authentication, the information packet comprising a user assertion that is an article of information that declares an existence of personal user data unknown to the first computer system without revealing the personal user data to the first computer system and is generated by a third computer system for the second computer system based on information provided by the user;

transmitting, by the first computer system in response to the request, an encrypted challenge to the second computer system, wherein the encrypted challenge is encrypted with a public key that is an asymmetric counterpart to a private key stored by the second computer system;

receiving, from the second computer system in response to the encrypted challenge, an encrypted response that is encrypted with the private key;

verifying, by the first computer system, that the encrypted response received from the second computer system is valid;

verifying, by the first computer system, that the user assertion received in the information packet from the second computer system is true;

creating, by the first computer system, a confirmation of the authentication proving that the user assertion is valid, wherein the authentication does not comprise the personal user data; and sending, by the first computer system, the confirmation of the authentication of the user assertion to the second computer system in response to the request to allow the user to access the data.

10. The non-transitory machine-accessible storage medium of claim 9, wherein the information packet is provided by a trusted information source that comprises the third computer system and has an expiry date.

11. The method of claim 1, wherein the first computer system and the third computer system do not communicate with one another for purposes of verifying the user assertion.

12. The non-transitory machine-accessible storage medium of claim 9, wherein the confirmation of the authentication is stored at the client.

13. The method of claim 1, wherein the second computer system is a client device.

14. The method of claim 1, wherein the second computer system is a server device.

15. The method of claim 1, wherein the information packet is static and does not have an expiry date.

16. The apparatus of claim 5, wherein the information packet has an expiry date.

17. The apparatus of claim 5, wherein the information packet is static and does not have an expiry date.

18. The apparatus of claim 5, wherein the computer system is at least one of a client device or a server device.

19. The apparatus of claim 5, wherein the apparatus and the trusted authority computer system do not communicate with one another for purposes of verifying the user assertion.

20. The non-transitory machine-accessible storage medium of claim 9, wherein the information packet is static and does not have an expiry date.

21. The non-transitory machine-accessible storage medium of claim 9, wherein the second computer system is at least one of a client device or a server device.

22. The non-transitory machine-accessible storage medium of claim 9, wherein the first computer system and the third computer system do not communicate with one another for purposes of verifying the user assertion.

\* \* \* \* \*